Figure 1:
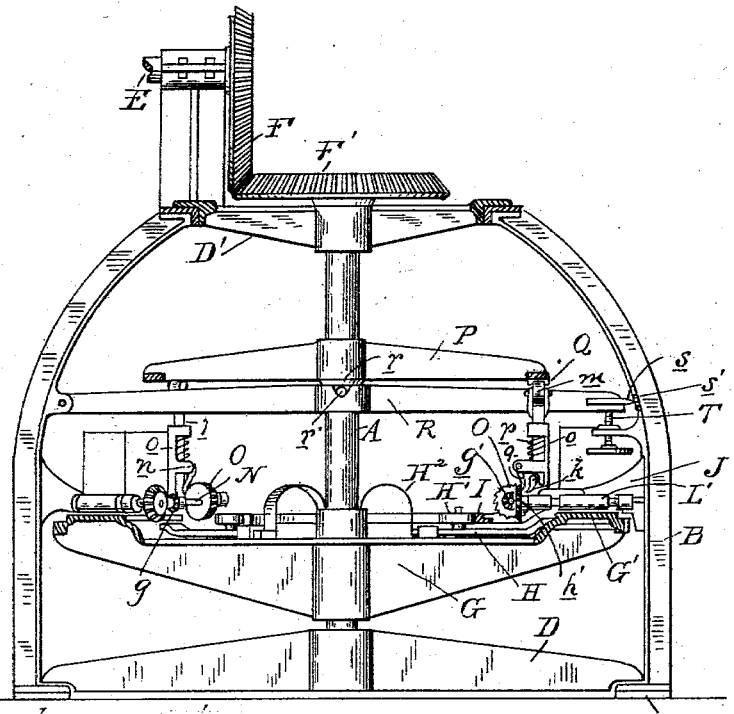

No. 633,822. Patented Sept. 26, 1899.
J. FENSOM.
EXCELSIOR MACHINE.
(Application filed Aug. 3, 1898.)
(No Model.)

Witnesses
W. B. Dogherty.
P. M. Hulbert.

Inventor
James Fensom
By Thos. L. Sprague & Son
Attys.

UNITED STATES PATENT OFFICE.

JAMES FENSOM, OF HILLMAN, MICHIGAN.

EXCELSIOR-MACHINE.

SPECIFICATION forming part of Letters Patent No. 633,822, dated September 26, 1899.

Application filed August 3, 1898. Serial No. 687,585. (No model.)

*To all whom it may concern:*

Be it known that I, JAMES FENSOM, a citizen of the United States, residing at Hillman, in the county of Montmorency and State of Michigan, have invented certain new and useful Improvements in Excelsior-Machines, of which the following is a specification, reference being had therein to the accompanying drawings.

My invention relates to improvements in excelsior-machines, and has more specific reference to the construction, arrangement, and operation of the feed and cutting mechanism, with the particular object in view to make a light-running machine and to overcome the jumping and bounding motion inherent to many of the machines in present use and which is the cause of great wear and tear of the parts, especially the knives, and causes the product to be uneven.

To this end my invention consists in certain specific improvements in the construction and arrangement of the feed and cutting mechanism and in the adjustments provided therefor to cut finer or coarser material, all as more fully hereinafter described, and specifically set forth in the drawings, in which—

Figures 2, 3, 4:
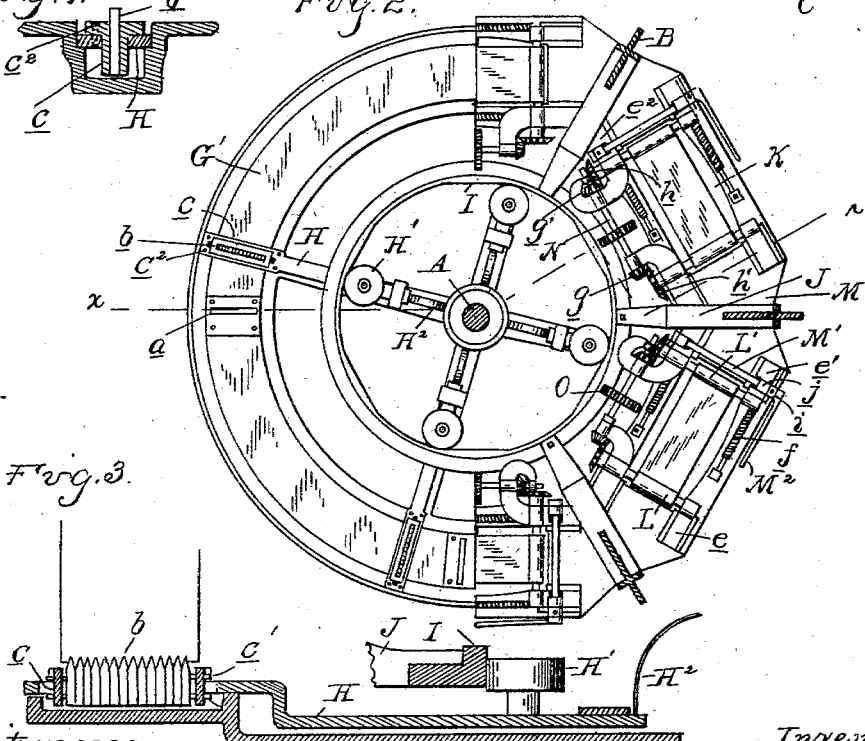

Figure 1 is a vertical central section of my improved machine on line $x\,x$, Fig. 2. Fig. 2 is a plan, the left half showing the cutter-wheel and the right half showing a plan of the stationary bed carrying the feed-boxes. Fig. 3 is a longitudinal section of the box carrying the scoring-knives and of the actuating-slide thereof. Fig. 4 is a cross-section thereof.

In the drawings, A represents the main shaft; B, the standards of the supporting-frame; C, the bed-plate; D, the bottom bridge-tree, formed with a central step for the main shaft A; D', the top bridge-tree, provided with a central bearing for the top of the shaft A; E, the drive-shaft, to which the power is applied, and F F' intermeshing gear-wheels for transmitting the power for rotating the shaft A.

Upon the shaft A is secured the cutting-wheel G, formed near its periphery with a raised annular flat portion G', which carries the four stripping-knives $a$ and the four scoring-knives $b$. The knives are placed radially and spaced apart at ninety degrees, each stripping-knife being preceded by a scoring-knife.

Each scoring-knife is carried by a sliding bar H, which is radially held in guide-bearings on the cutting-wheel and carries at its inner end an antifriction-wheel H', held by a spring $H^2$ in traveling contact with the inner face of the cam-ring I, which is fixedly held in position concentric with the cutter-wheel by means of brackets J, projecting inwardly from the standards B of the frame.

Each scoring-knife is formed in the usual manner of a series of sharpened spurs assembled in a box $c$ by means of set-screws $c'$ passing through the opposite ends of the box and clamping the spurs together from both ends, so that by the adjustment of these screws the scoring-knife as a whole may be adjusted. The box $c$ is removably secured by screws $c^2$ in the outer end of the sliding bar.

Above the cutter-wheel are arranged the feed-boxes, which receive the blocks. They are six in number, spaced at equal distances apart around the circle. Each feed-box is composed of two feed-rollers L L', supported upon a horizontal bed-plate M, secured in between the brackets J and having an opening K for the block to pass through.

One of each pair of feed-rollers is journaled in fixed bearings $e\,e$, and the other L' in sliding bearings $e'\,e'$, the latter of which are connected to springs $f$, the tension of which draws the feed-roller L' toward the other feed-roller L.

Each pair of feed-rollers receives motion from a feed-shaft N, journaled at right angles thereto and provided with bevel-pinions $g\,g'$, meshing with bevel gear-wheels $h\,h'$ on the adjacent ends of the feed-rollers. The bevel-pinion $g'$ has a sliding engagement with the feed-shaft, and it is carried in mesh with the bevel-gear $h'$ by means of a sliding bearing $e^2$, which is united with the adjacent sliding bearing $e'$ of the feed-roller.

M' is a shaft journaled in fixed bearings $i\,i$ and carrying eccentrics $j\,j$, (shown in plan view in Fig. 2,) which serve to clamp the sliding bearings $e'\,e'$ adjustably in position. The eccentrics are thrown in and out of position by turning the shaft M', which has a suitable handle $M^2$ for the purpose.

The feed-shaft N carries a ratchet-wheel O, into which engages a feed-pawl k, carried by a vertical sliding bar l, which on top carries an antifriction-roller m. The sliding bar is supported in guide-bearings n, carried by a standard o upon the feed-table, and it is also provided with a retracting-spring p. A back-stop q prevents the ratchet-wheel from rotating backward.

P is the feed-wheel. It rotates with the main shaft and is provided at equidistant points on its under side with four projections Q, adapted in the rotation of the wheel to strike the rollers m and depress them in passing over them. The feed-wheel has a spline-and-groove engagement with the shaft and is adjustably held in position thereon by the regulating-lever R, which is pivoted at one end to the frame and at its diametrically opposite end rests upon an adjusting-screw T. The lever has a central hub in which is supported the loose collar r, which has gudgeons r' resting in bearings of the hub and carries the feed-wheel. At its free end it carries an index-hand s, which points on a scale s'.

The parts being arranged as shown and described, they are intended to operate as follows: The scoring-knives being guided by the cam-ring, I have a radially-sliding motion positively imparted to them by the straight portions of the cam-ring, which causes these knives to score the block substantially straight with the grain of the wood. The stripping-knives operate in the usual manner, and as there are six blocks to only four scoring and stripping knives there will always be two diametrically opposite knives constantly at work. By so doing the entire wheel has a perfectly even and steady motion. The feed is effected by the operation of the feed-wheel, which in rotating in unison with the cutter-wheel strikes with the projection Q on its under side against the rollers m and depresses the sliding bar l, which motion is transmitted through the shaft N to the feed-rollers. Each block is thus set in position by about two inches of travel of the wheel and is held firmly while the knives are operating against it. Each block is thus fed independently of any other, and the feeding is accomplished upon two diametrically opposite blocks at a time, and thus overcome the objections to a constant and continuous feed.

The boxes which carry the scoring-knives are provided with set-screws at opposite ends, which permit the knives to be adjusted longitudinally, whereby the spurs in one knife-box are prevented from traversing the cuts in the block made by the spurs in the preceding box.

The machine will cut fine or coarse excelsior, according to the adjustment of the screw T, the grade of excelsior which the machine cuts being indicated on the scale.

What I claim as my invention is—

1. In an excelsior-machine, the combination of the rotating vertical main shaft, the horizontal cutter-wheel on said shaft carrying the cutters, the feed-boxes supported above said cutter-wheel and provided with feed mechanism, a feed-wheel in the main shaft above the feed-boxes and provided with cams or projections on its under side actuating the feed mechanism of the boxes, a lever supporting said feed-wheel vertically adjustably upon the main shaft, and an adjusting-screw supporting the free end of the lever.

2. In an excelsior-machine, the combination with the main shaft and the revolving cutter-wheel, of pairs of feed-rollers L L' feed-shafts N, having intermediate gearing connecting them with the feed-rollers, the ratchet-wheel O on each feed-shaft, the slide l supported in vertical bearings and carrying a feed-pawl engaging with the ratchet-wheel, the retracting-spring p of the slide, the antifriction-wheel m carried by the slide, the feed-wheel P slidingly engaging the main shaft and provided with the projections Q, the lever R, the loose collar r between the lever and feed-wheel, the adjusting-screw T, the index-hand s carried by the lever and the scale s'.

In testimony whereof I affix my signature in presence of two witnesses.

JAMES FENSOM.

Witnesses:
JAS. E. MCDONALD,
MAX HOLDERSED.